United States Patent
Razavi et al.

(10) Patent No.: US 7,986,726 B2
(45) Date of Patent: Jul. 26, 2011

(54) CMOS TRANSCEIVER FOR COMMUNICATION SYSTEM

(75) Inventors: Behzad Razavi, Irvine, CA (US);
Han-Chang Kang, Irvine, CA (US);
Turgut Aytur, Plattsburgh, NY (US);
Ran Yan, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 1064 days.

(21) Appl. No.: 11/267,829

(22) Filed: Nov. 3, 2005

(65) Prior Publication Data

US 2006/0103473 A1    May 18, 2006

Related U.S. Application Data

(60) Provisional application No. 60/624,891, filed on Nov. 3, 2004.

(51) Int. Cl.
*H04B 1/38* (2006.01)
(52) U.S. Cl. .......................... 375/219; 330/253
(58) Field of Classification Search .................. 375/219; 330/253
See application file for complete search history.

(56) References Cited

U.S. PATENT DOCUMENTS

| | | | |
|---|---|---|---|
| 6,304,623 B1 | 10/2001 | Richards et al. | |
| 6,606,489 B2 | 8/2003 | Razavi et al. | |
| 6,681,103 B1* | 1/2004 | Rogers et al. | 455/302 |
| 6,748,204 B1 | 6/2004 | Razavi et al. | |
| 6,807,406 B1 | 10/2004 | Razavi et al. | |
| 7,071,779 B2* | 7/2006 | Shi et al. | 330/253 |
| 7,292,189 B2* | 11/2007 | Orr et al. | 342/465 |
| 2002/0111152 A1 | 8/2002 | Razavi et al. | |
| 2002/0147014 A1 | 10/2002 | Atarius et al. | |
| 2003/0007450 A1 | 1/2003 | Ohtaki | |
| 2003/0169828 A1 | 9/2003 | Roberts | |
| 2004/0029543 A1 | 2/2004 | Steele et al. | |
| 2006/0002501 A1* | 1/2006 | Muller | 375/371 |
| 2007/0177653 A1* | 8/2007 | Bjerede | 375/130 |

FOREIGN PATENT DOCUMENTS

| | | |
|---|---|---|
| JP | 1988161739 A | 7/1988 |
| JP | 1990067031 A | 3/1990 |
| JP | 1994284109 A | 10/1994 |
| JP | 2001119251 A | 4/2001 |
| JP | 2006519507 A | 8/2006 |
| TW | 341005 | 9/1998 |
| TW | 583852 B | 4/2004 |

OTHER PUBLICATIONS

Search Report for Taiwan Patent Application No. 94138597, Applicant Wionics Research, Taiwan Search Report dated Jul. 24, 2008 (3 pgs.)

(Continued)

*Primary Examiner* — Chieh M. Fan
*Assistant Examiner* — Freshteh N Aghdam
(74) *Attorney, Agent, or Firm* — Thomas, Kayden, Horstemeyer & Risley, LLP

(57) ABSTRACT

A direct conversion ultrawideband transceiver employing three phase locked loops (PLLs). The PLLs are preferably fixed-frequency PLLs that operate continuously, at different frequencies, with a selected frequency determined by selecting the output of one of the three PLLs. The use of three PLLs is suitable for use in a communication system employing frequency hopping across three bands or sub-bands.

13 Claims, 5 Drawing Sheets

OTHER PUBLICATIONS

International Search Report for International Patent Application No. PCT/US2005/040130, filed Nov. 3, 2005, International Search Report dated Aug. 31, 2007 and mailed Oct. 29, 2007 (4 pgs.)
Written Opinion of the International Searching Authority for International Patent Application No. PCT/US2005/040130, filed Nov. 3, 2005, Written Opinion dated Oct. 19, 2007 and mailed Oct. 29, 2007 (6 pgs.)
Japanese language office action mailed Mar. 16, 2010.
English translation of abstract of JP 1994284109 (downloaded from www.jpo.go.jp).
English translation of abstract of JP 2001119251 (downloaded from www.jpo.go.jp).
English translation of abstract of JP 1990067031 (downloaded from www.jpo.go.jp).
English translation of abstract of JP 1998161739 (downloaded from www.jpo.go.jp).

* cited by examiner

CMOS TRANSCEIVER FOR COMMUNICATION SYSTEM

CROSS-REFERENCE TO RELATED APPLICATION(S)

This application claims the benefit of U.S. Provisional Patent Application No. 60/624,891, filed Nov. 3, 2004 which is hereby incorporated by reference as if set forth full herein.

BACKGROUND OF THE INVENTION

The present invention relates generally to wideband transceivers, and more particularly to wideband transceivers using multiple phase-locked loops (PLLs).

Ultrawideband (UWB) communication has been proposed for high data rate applications. The data may be transmitted, for example, using direct sequence or orthogonal frequency division multiplexing (OFDM) schemes, and may accommodate data transmission as high as 480 Mb/s or more.

In one such proposal data may be transmitted in the frequency range from 3.168 GHz to 10.560 GHz, subdivided into 5 band groups. Initial efforts for this proposal, however, are generally aimed at operation in a first of these band groups, which provides for data transmission in three sub-bands over the frequency range of 3.168 GHz to 4.752 GHz. The three sub-bands are centered at 3.432 GHz, 3.960 GHz, and 4.488 GHz, and each occupy 528 MHz of spectrum.

Communication of data on these sub-bands may be performed with a transmitter and a receiver switching from sub-band to sub-band on a periodic basis, and doing so while communicating data. A guard interval may be provided to account for transient effects while the transmitter and receiver switch sub-bands. The sub-band switching time, however, may not be great, for example in the range of 9 nanoseconds, and it may be difficult for the transmitter and receiver to effectively change sub-bands within an allocated time period.

In view of potentially short sub-band switching time, use of wideband PLLs might be difficult, particularly if the wideband PLL can not quickly lock on to a correct data rate. Similarly, use of single sideband mixers may also generate signals containing excess harmonic distortion and otherwise dissipate excess power, either through filtering of the signals, amplification of data signals, or both.

SUMMARY OF THE INVENTION

The invention provides an Ultrawideband Transceiver. In some aspects the invention provides a receiver with a plurality of phase locked loops (PLLs) with each PLL providing a signal to a corresponding mixer, with each corresponding mixer also receiving a data signal. In some aspects the invention provides from a low noise amplifier, and a summer receiving outputs of the mixers. In some aspects a band select signal selectively couples signals from the PLLs with the corresponding mixers, and in some aspects the corresponding mixers receive a band selected signal from a low noise amplifier amplifying a received signal. In some aspects the invention provides a plurality of PLLs whose outputs are summed and provided to a mixer upconverting an information signal for transmission, and in some aspects a band select signal is used to select a particular PLL signal.

In one aspect the invention provides a transceiver for use in an ultrawideband communication system, comprising a plurality of phase-locked loops (PLLs), each of the PLLs providing a signal at a different frequency; a plurality of mixers, each of the mixers configured to mix a signal generated from a corresponding PLL of the plurality of PLLs with a radio frequency signal to thereby downconvert the radio frequency signal to baseband; and gate circuitry responsive to a selection signal, the gate circuitry gating the signals provided by the PLLs such that only a signal from a single PLL is provided to a mixer at a given time.

In another aspect the invention provides a transceiver for use in an ultrawideband communication system communicating data over three frequency sub-bands in a frequency hopping manner, comprising three phase-locked loops (PLLs) each providing a mixing signal at a different frequency; three direct downconvert mixers each receiving an amplified RF signal and a mixing signal from a corresponding one of the three PLLs; and means for gating the mixing signals from the PLLs responsive to a sub-band select signal such that only a single mixer of the three mixers receives a mixing signal from the PLLs at a selected time.

In another aspect the invention provides a transceiver for use in an ultrawideband communication system, comprising a low noise amplifier receiving an RF signal and providing an amplified RF signal; a plurality of mixers, with a mixer for each sub-band used in the ultrawideband communication system, each of the plurality of mixers receiving a representation of the amplified RF signal and configured to receive a mixing signal for direct downconversion of signals in one of the sub-bands used in the ultrawideband communication system; a plurality of phase-locked loops (PLLs), with a PLL for each sub-band used in the ultrawideband communication system, each of the PLLs generating a mixing signal for direct downconversion of signals in one of the sub-bands used in the ultrawideband communication system; and means for gating the mixing signals responsive to a sub-band selection signal such that only a single mixer downconverts a representation of the amplified RF signal.

These and other aspects of the invention are more fully comprehended on review of the following description in conjunction with the associated drawings.

DETAILED DESCRIPTION OF THE INVENTION

Figure 1:
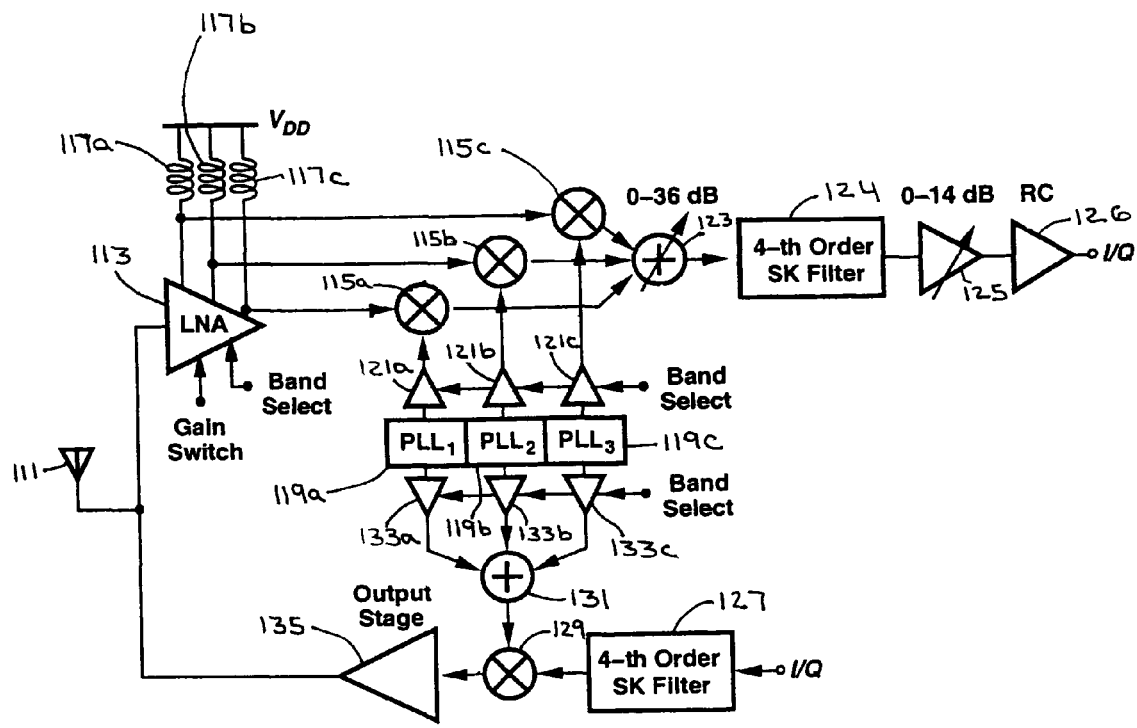
FIG. 1 is a block diagram of a transceiver architecture in accordance with aspects of the invention.

FIG. 1 is a block diagram of a transceiver architecture in accordance with aspects of the invention. An antenna 111 is coupled to an input of a low noise amplifier (LNA) 113. The LNA also receives a gain switch signal and a band select signal. In many embodiments it should be noted, however, that the band select signal may be more properly referred to as a sub-band select signal, and in some embodiments as a frequency select signal. The LNA provides as outputs three signals, each of which is coupled to one of three mixers 115a-c. The LNA output signals provided to the mixers are also coupled to switched resonant networks, illustrated as inductors 117a-c, which provide, for example, for filtering of the LNA output signals.

For clarity of discussion, only three mixers, for example, are shown and specifically discussed. In many embodiments, however, signal processing is performed for both in-phase and quadrature signals. Accordingly, it should be recognized that the mixers generally represent sets of mixers. Moreover, in many embodiments circuitry for providing both in-phase and quadrature signal processing is also generally provided, and, although not specifically illustrated in FIG. 1, differential signal processing is performed in many embodiments. Further, in various embodiments additional mixers, as part of additional receive and transmit chains, are also provided.

Returning to FIG. 1, three mixing signals are provided to the three mixers, with each mixer receiving a different mixing signal. Three PLLs 119a-c source the three mixing signals, with each PLL sourcing a single mixing signal. In some embodiments a first of the PLLs provides a mixing signal approximate 3.432 GHz, a second of the PLLs provides a mixing signal approximate 3.960 GHz, and a third of the PLLs provides a mixing signal approximate 4.488 GHz. The PLLs are preferably fixed-modulus PLLs to reduce noise in the mixing signals, and in many embodiments the PLLs preferably employ ring oscillators. As is understood by those of skill in the art, the PLLs are each provided a reference signal at a fixed frequency generated by a crystal or signal generator (not shown) approximate a fixed frequency, and generate an output signal, in this case a mixing signal, some multiple of the fixed frequency.

The mixing signals are gated by gates 121a-c, with operation of the gates controlled by the band select signal. The mixing signal for the selected band is allowed to pass it corresponding gate and reach its corresponding mixer, while the other mixing signals are blocked by their corresponding gates. Accordingly, the mixing signal for the selected band is allowed to reach its corresponding mixer, with resultant downconversion to baseband of the input signal to that mixer.

The outputs of the mixer are provided to a variable gain summer 123. The variable gain summer sums the outputs of the mixers, one of which has been downconverted, and an output of the variable gain summer is received by a filter 124. As illustrated, the filter is a fourth order Sallen-Key (SK) filter. An output of a the filter is received by a programmable gain stage 125, the output of which is further filtered by a further filter 126, which as illustrated is a first order RC filter. Further processing of the receive chain signal may thereafter be provided by other components (not shown).

For the transmit chain, a signal for transmission is received by a filter 127, also a fourth order SK filter as illustrated in FIG. 1. An output of the filter is received by a mixer 129. The mixer 129 also receives a mixing signal from a summer 131. The summer receives gated signals from the three previously mentioned PLLs, with the signals from each of the PLLs being gated by corresponding gates 133a-c. Operation of the gates 133a-c is also controlled by the band select signal, with a signal from only one of the PLLs being allowed to pass through its corresponding gate at any time. Accordingly, the mixer receives as a mixing signal a signal approximate 3.432 GHz, 3.960 GHz, or 4.488 GHz as selected by the band select signal. The output of the mixer is provided to an output stage 135, with the output stage performing, for example, amplification of the signal as appropriate for transmission by the antenna.

Figure 2:
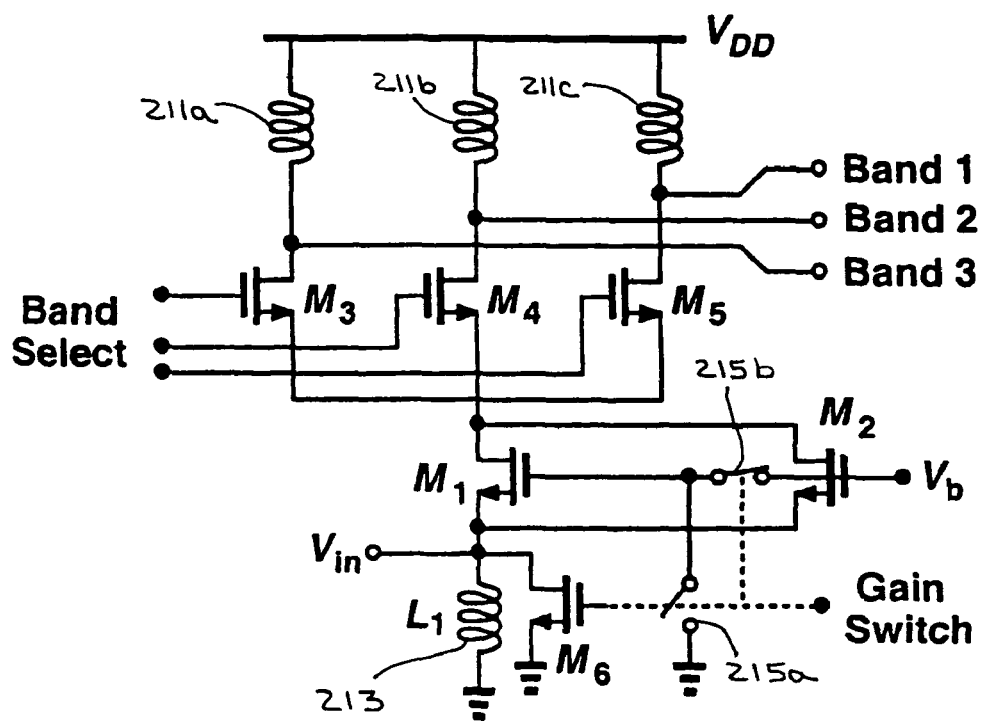
FIG. 2 is a semi-schematic diagram of a low noise amplifier in accordance with aspects of the invention.

FIG. 2 illustrates a semi-schematic of a low noise amplifier in accordance with aspects of the invention. The LNA of FIG. 2 is used, in some embodiments, as the LNA of the system of FIG. 1. The LNA includes switched cascode drivers M3, M4, and M5. Gates of the switched cascode drivers are each coupled to a band select signal. When a first band is selected cascode driver M5 is set to an on state, when a second band is selected cascode driver M4 is set to an on state, and when a third band is selected cascode driver M3 is set to an on state.

Each of the cascode drivers provide outputs at their drains, and each of the drains is also coupled to a resonant tank 211a-c, illustrated schematically as, and in some embodiments comprising, inductors. Each of the resonant tanks preferably have a resonant frequency centered at the resonant frequency of their respective band. In many embodiments the Q of the tanks are selected to reduce droop near band edges, with the Q being set to or approximate 3 in many embodiments, with the droops canceled by slight peaking in the baseband filters in some embodiments.

Sources of the cascode drivers are coupled to a cascode common-gate stage. The cascode common gate stage includes gate coupled transistors M1 and M2. The gates of M1 and M2 are coupled to a voltage bias source. Drains of M1 and M2 are coupled to sources of transistors M3, M4, and M5. Sources of M1 and M2 are coupled to an RF input and, by way of a source inductance 213, to ground. Preferably the source inductance is approximate 20 nH, resonating, with the capacitance at this node, approximate 3.5 GHz, thereby presenting a relatively high impedance across all three bands.

The gate of M1 is switchably coupled to either the gate of M2 or to ground by switches 215a,b controlled by a gain signal, allowing M1 to be set to an off state. Turning M1 off reduces the gain of the LNA. The magnitude of the gain reduction may be chosen through selection of width/length (W/L) ratios of M1 and M2, with the W/L of M1 approximately 8 times the W/L of M2. In many implementations length is common to transistors on a substrate, and the W/L ratio is modified merely by adjusting width.

Setting M1 to the off state, however, may result in an increase to input impedance. Accordingly, a transistor M6 is coupled in parallel to the source inductance, and is turned on when M1 is turned off. The on-resistance of M6 varies with process and temperature, but generally provides for a magnitude of the S11 parameter to be greater than 10 dB.

Figure 3:
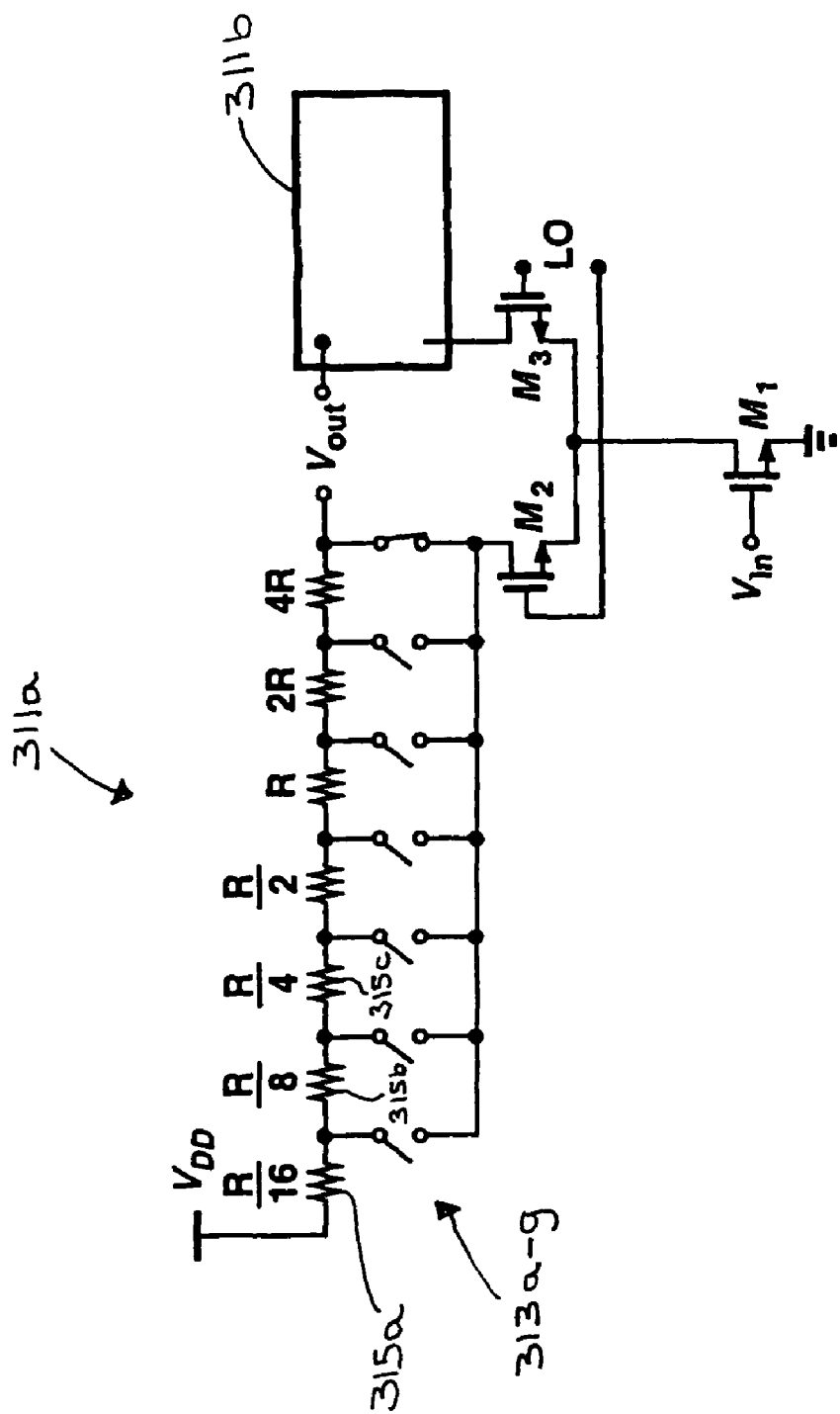
FIG. 3 is a semi-schematic of a mixer in accordance with aspects of the invention.

FIG. 3 is a semi-schematic of a mixer in accordance with aspects of the invention. In some embodiments the mixer of FIG. 3 is used for the mixers of the system of FIG. 1. The mixer of FIG. 3 mixes an RF signal, preferably amplified by a low noise amplifier, with a mixing signal sourced by a local oscillator (LO), such as in a PLL.

The oscillator includes a differential pair M2 and M3, which receive a differential LO signal at their gates. Sources of M2 and M3 are coupled to a drain of a driving transistor M1. The gate of M1 receives an RF signal for downconversion, and has a source coupled to ground. In various embodiments additional bias transistors may be interposed between the driving transistor M1 and ground, or between the differential pair and the driving transistor, providing bias current.

Drains of the differential pair, from which a differential output signal are taken, are each coupled to Vdd by a selectable resistive network 311a,b. Taking the resistive network coupled to the drain of M2 as an example, the resistive network includes a plurality of resistances coupled in series, with nodes between each of the resistances switchably coupled by gates 313a-g to the drain of M2. As illustrated in FIG. 3, the resistances are provided by resistors, although in various embodiments the resistances are provided through use of transistors, and may make use of selectable resistances provided by transistors operating in their linear range.

In somewhat more detail, the resistances of the resistive network form a resistive ladder, with taps along the ladder switchably coupled to the drain of M2. As illustrated, the resistive ladder is a binary scaled ladder, with a first resistance 315a coupled to Vdd, a second resistance 315b twice the magnitude of the first resistance coupled to the first resistance, a third resistance 315c twice the magnitude of the second resistance coupled to the second resistance, etc. In the embodiment illustrated seven such resistances are so coupled, with each resistance in the ladder having a resistance double the magnitude of the prior resistance in the ladder, and taps between each resistance. The resistive ladder provides high linearity, gain steps substantially linear in dB, and a substantially constant output impedance.

Figure 4:
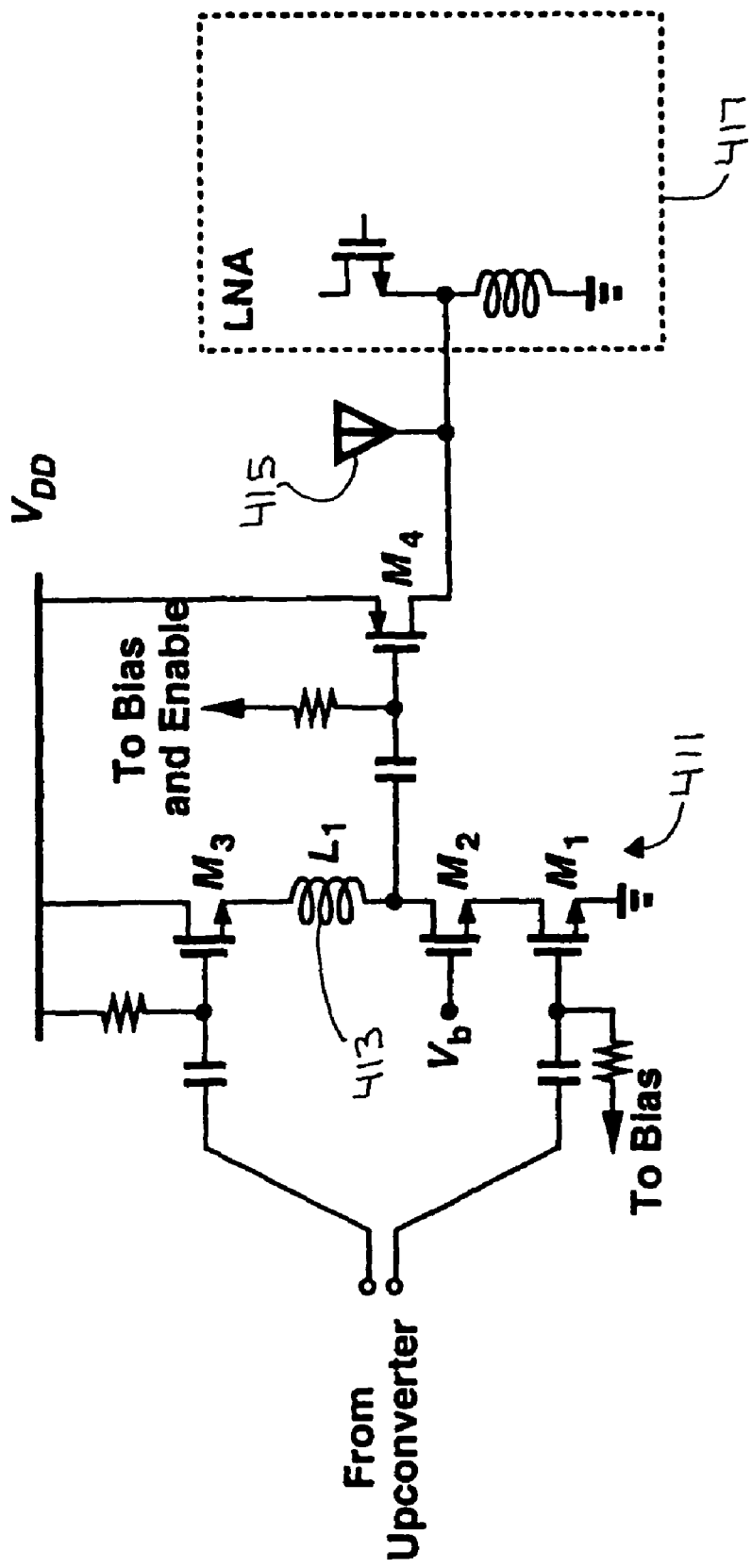
FIG. 4 is a semi-schematic of a transmitter output stage in accordance with aspects of the invention, additionally showing an antenna and a portion of a low noise amplifier.

FIG. 4 is a semi-schematic in accordance with aspects of the invention showing a portion of an output stage, antenna, and portion of a low noise amplifier. An upconverted differential signal is provided to the portion of the output stage. The upconverted differential signal is ac-coupled to a differential to single ended converter 411 comprised of transistors M1, M2, and M3. More specifically, as shown in FIG. 4, M2 is coupled between M1 and M3, with the gate of M2 provided a bias signal. Also coupled between the source of M3 and the drain of M2 is an inductor 413, preferably resonating with a low Q so as to improve bandwidth, particularly over 4 GHz. The differential pair is coupled to the gates of M1 and M3, with a single ended output taken between the drain of M2 and the inductor.

The single ended output is ac-coupled to a gate of a driver transistor M4, which delivers an output to an antenna 415. The gate of M4 is also coupled to enable circuitry, which allows M4 to deliver the output signal when an enable signal is high. In some embodiment the enable signal is also used to disable a low noise amplifier 417 also coupled to the antenna.

In one embodiment circuitry in accordance with the foregoing is implemented in 0.13 um CMOS technology, on, for example, a 0.9 mm×0.8 mm die provided a 1.5 V power supply. In such an embodiment, using three bands (or more properly, sub-bands), each in use approximately one-third of the time, noise in sub-bands 1 and 2 (the lower frequency sub-bands) is approximately 5.5 dB, with noise in sub-band 3 approximately 8.4 dB. Table 1 summarizes some aspects relating to the embodiment.

TABLE 1

| | |
|---|---|
| Voltage Gain | 69-73 dB |
| Noise Figure | 5.5-8.4 dB |
| In-Band 1-dB Compression Point | |
| High LNA Gain | −27.5-29.5 dBm |
| Low LNA Gain | −9.5-12.5 dBm |
| S11 | |
| High LNA Gain | −12 dB |
| Low LNA Gain | −11 dB |
| TX Output 1-dB Comp. | −10 dBm |
| Phase Noise @ 1-MHz Offset | −104-108 dBc/Hz |
| Power Dissipation | 105 mW |
| Supply Voltage | 1.5 V |
| Technology | 0.13-um CMOS |

Figure 5:
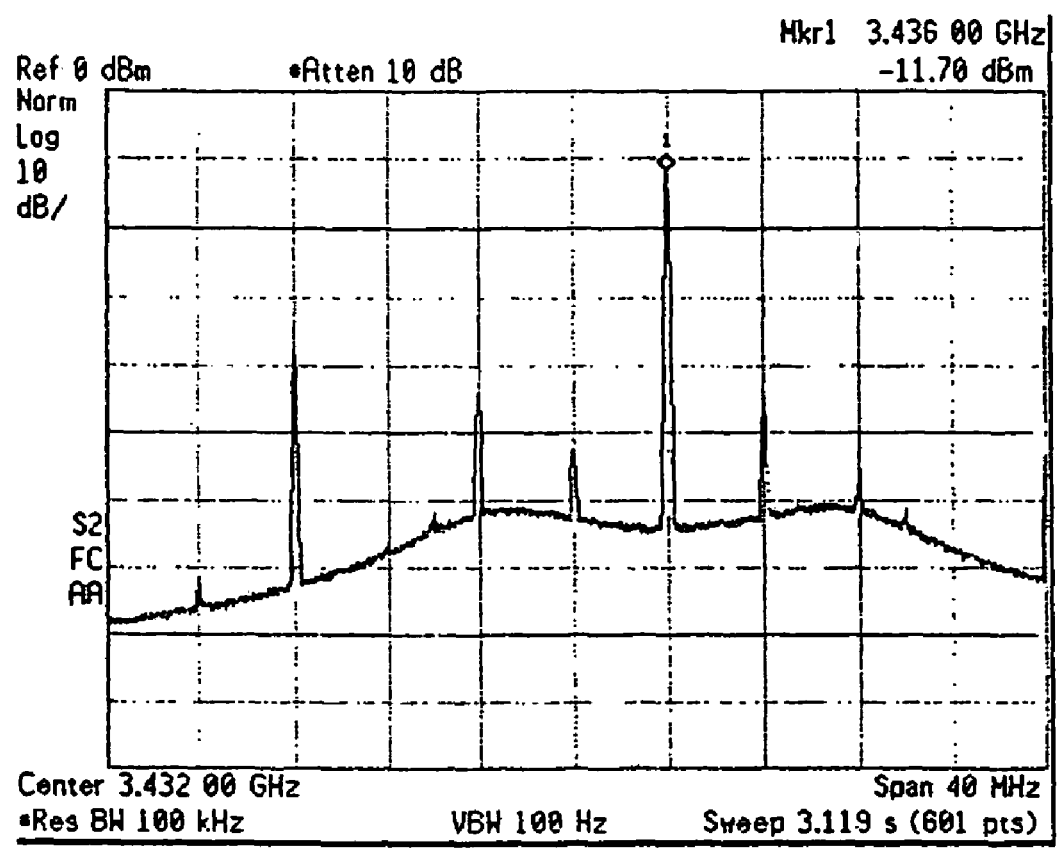
FIG. 5 shows an example transmitter output.

In addition, FIG. 5 shows an example transmitter output with a 4 MHz tone applied to the baseband Accordingly, the invention provides in some aspects an ultrawideband transceiver. Although the invention has been described with respect to certain embodiments, it should be recognized that the invention may comprise the claims and their insubstantial variations supported by this disclosure.

What is claimed is:

1. A transceiver for use in an communication system, comprising:

a plurality of phase-locked loops (PLLs), each of the PLLs providing a signal at a different frequency;

a plurality of mixers, each of the mixers configured to mix the signal generated from a corresponding PLL of the plurality of PLLs with a radio frequency signal to thereby downconvert the radio frequency signal to baseband;

a low noise amplifier having a cascode common gate stage, receiving the radio frequency signal and providing a plurality of amplified radio frequency signals to the plurality of mixers, wherein each of the plurality of amplified radio frequency signals being provided to a corresponding one of the plurality of mixers, the low noise amplifier including a corresponding plurality of amplifiers each coupled to a resonant tank and selectively activated by a selection signal; and gate circuitry responsive to the selection signal, the gate circuitry gating the signals provided by the PLLs such that only the signal from a single PLL is provided to one mixer at a given time.

2. The transceiver of claim 1 wherein the PLLs are fixed frequency PLLs.

3. The transceiver of claim 1 wherein the PLLs are fixed modulus PLLs.

4. The transceiver of claim 1 further comprising a summer configured to receive and sum signals from the plurality of mixers.

5. The transceiver of claim 1 further comprising a further mixer, the further mixer receiving a baseband signal for transmission and a mixing signal generated from one of the PLLs.

6. The transceiver of claim 5 further comprising additional gate circuitry and a further summer, the additional gate circuitry gating signals generated from the PLLs in response to the selection signal such that only a signal from a single PLL passes the additional gate circuitry, with the further summer configured to receive signals from the gate circuitry, sum the signals, and provide the summed signal to the further mixer as the mixing signal.

7. The transceiver of claim 4 further comprising a filter filtering the summed signal from the summer.

8. A transceiver for use in an communication system communicating data over three frequency sub-bands in a frequency hopping manner, comprising:

three phase-locked loops (PLLs) each providing a mixing signal at a different frequency;

a low noise amplifier having a cascode common gate stage, receiving a radio frequency (RF) signal and providing three amplified RF signals to three direct downconvert mixers, wherein each of the three amplified RF signals being provided to a corresponding one of the three direct downconvert mixers, the low noise amplifier including a corresponding plurality of amplifiers each coupled to a resonant tank and selectively activated by a sub-band select signal;

the three direct downconvert mixers each receiving an amplified RF signal and a the mixing signal from a corresponding one of the three PLLs; and means for gating the mixing signals from the PLLs responsive to the sub-band select signal such that only one of the three direct downconvert mixers receives the mixing signal from the PLLs at a selected time.

9. The transceiver of claim 8 further comprising a further mixer, the further mixer upconverting a baseband signal to an RF signal based on a mixing signal from the PLLs; and means for gating the mixing signals from the PLLs responsive to the sub-band signal such that the further mixer receives only a single mixing signal from the PLLs at a selected time.

10. A transceiver for use in an communication system, comprising:
- a low noise amplifier having a cascode common gate stage, receiving a radio frequency (RF) signal and providing a plurality of amplified RF signals each in a separate sub-band to a plurality of mixers, wherein
- each of the plurality of amplified RF signals being provided to a corresponding one of the plurality of mixers, the low noise amplifier including a corresponding plurality of amplifiers each coupled to a resonant tank and selectively activated by the sub-band selection signal;
- the plurality of mixers, with a mixer for each sub-band used in the communication system, each of the plurality of mixers receiving a representation of the amplified RF signal and configured to receive a mixing signal for direct downconversion of signals in one of the sub-bands used in the communication system;
- a plurality of phase-locked loops (PLLs), with a PLL for each sub-band used in the communication system, each of the PLLs generating a mixing signal for direct downconversion of signals in one of the sub-bands used in the communication system; and
- means for gating the mixing signals responsive to a sub-band selection signal such that only a single mixer downconverts a representation of the amplified RF signal.

11. The transceiver of claim 10 further comprising a summer summing output signals from the mixers.

12. The transceiver of claim 11 further comprising a filter filtering the summed output signal.

13. The transceiver of claim 10 further comprising a further mixer upconverting a baseband signal to a transmitted radio frequency signal, the further mixer receiving a mixing signal from the PLLs, with the further mixer receiving a single mixing signal at a selected time.

* * * * *